United States Patent [19]
Chapman

[11] 4,314,275
[45] Feb. 2, 1982

[54] INFRARED TIME DELAY WITH INTEGRATION CTD IMAGER

[75] Inventor: Richard A. Chapman, Dallas, Tex.

[73] Assignee: Texas Instruments Incorporated, Dallas, Tex.

[21] Appl. No.: 132,911

[22] Filed: Mar. 24, 1980

[51] Int. Cl.³ .............................................. H04N 7/18
[52] U.S. Cl. ................................... 358/113; 358/213
[58] Field of Search ................................. 358/113, 213

[56] References Cited

U.S. PATENT DOCUMENTS

| | | | |
|---|---|---|---|
| 3,912,927 | 10/1975 | Hoffman | 350/6.6 |
| 3,953,733 | 4/1976 | Levine | |
| 4,129,887 | 12/1978 | Michon | 358/213 |
| 4,231,149 | 11/1980 | Chapman | |

OTHER PUBLICATIONS

*IEEE Transactions on Electron Devices*, vol. ED-27, No. 1, Jan. 1980, "Monolithic Hg Cd Te Charge Transfer Device Infrared Imaging Array".

Primary Examiner—Howard Britton
Attorney, Agent, or Firm—Rene' E. Grossman; Melvin Sharp; James T. Comfort

[57] ABSTRACT

A scanning type infrared imaging system comprising a lens system, a scanner, an infrared sensing matrix and a signal processor. Said lens system is for focusing infrared energy emanating from a scene onto the infrared sensing matrix. Said scanner is for scanning the infrared energy emanating from the scene. Said infrared sensing matrix is for converting the infrared energy into charge packets representative of the impinging infrared energy, and said signal processor is for processing the electrical signals into video signals. Said infrared sensing matrix comprises an array of charge transfer device elements arranged in rows and columns. Each element has four electrodes for receiving phase 1, phase 2, phase 3 and phase 4 pulses. The phase 3 and phase 1 electrodes are for transfer gates and the phase 2 and phase 4 electrodes are for charge storage wells. The pulses applied to the charge storage wells move the packet charges down the parallel-column shift registers at a rate substantially equal to the scanning rate of the scanner thereby providing time delay with integration of the charge packets before the signal leaves the infrared sensing charge transfer device matrix. To provide charge storage wells of sufficient depth to hold the integrated charge packets the pulses applied to each succeeding stage potential well electrodes or groups of electrodes are increased in voltage. The charge packets from the parallel-column registers are clocked out by a serial shift register to a floating gate or diode where the charge packet creates a voltage signal for signal processing by the signal processor.

12 Claims, 9 Drawing Figures

INFRARED TIME DELAY WITH INTEGRATION CTD IMAGER

This invention relates the infrared detector systems and more particular to an infrared detector system utilizing charge transfer device sensors.

Infrared energy imaging systems are two types: staring and non-staring. Non-staring systems include: an optical assembly for focusing infrared energy emanating from a scene within the field-of-view; a scanning assembly for scanning the focused energy, and an infrared detector for converting the scanned energy into electrical signals representative of the scene for a signal processor. The signal processor includes a preamplifier for amplifying the electrical signals to a working level for processing into video signals. The signal from the prior art infrared detector which does not use time delay and integration is directly proportional to the time required for the smallest resolvable image pixel to pass across the detector (integration time); the radiation-background-limited noise and background-limited signal-to-noise ratio are directly proportional to the square-root of the integration time. The integration time is set by the image scan velocity and the size of the detector; thus, the integration time cannot be arbitrarily increased for the prior art detector.

The infrared detector fabricated on an infrared sensitive material such as HgCdTe has included a parallel shift register which is read out to a single floating gate or diode output. The parallel register has two, three or four phases per stage. The circuit used at the floating gate can include (1) an on chip output and reset field effect transistors (FETs) or (2) a silicon chip with output and reset field effect transistors. Each stage in the shift register constitutes one infrared detector; therefore, a shift register with "n" stages has "n" infrared detectors read out from one floating gate or diode output.

The infrared detector is used in conjunction with the mechanical scanner which moves an infrared image parallel to the direction of charge transfer in the parallel register. The velocity of motion of the infrared imager is made equal to the average velocity of motion of the charges in the register. Thus, as an infrared picture element (pixel) is scanned in synchronization with the phase movement, each bit of data exiting the parallel register has seen the same infrared pixel during its movement through the parallel register.

Accordingly, the problem in the prior art has been that the charge packets in the parallel shift register potential wells increase in size from the first to the last stages and overflow after saturation. To prevent the overflow, the integration time for signal photons has to be curtailed. However, as the signal output is directly proportional to the integration time, this limitation set by overfilling is very deleterious. In the prior art devices, the maximum capacity has been set by electric field breakdown in the empty well in the infrared sensitive semiconductor such as mercury cadmium telluride. In the present invention, larger capacity is obtained by using successively larger voltages and well depths down the parallel shift register; the infrared background provides an increasing background fat zero charge which can be set to keep the available charge capacity and electric field constant along the length of the shift register.

In a charge coupled device (CCD) shift register, a fat zero charge must be placed in the well to cover up surface states and improve charge transfer efficiency. A fat zero requirement of 30% is a typical requirement for good charge transfer efficiency. A fat zero charge is usually put in at the far end of a shift register and the fat zero charge diminishes the charge capacity available to store infrared background and signal generated charge. The continuous clocks used in operating the parallel register stages in a infrared background result in the collection of infrared generated or dark current generated charge. This charge generated by infrared background or dark current constitutes an additional fat zero charge which increases from the first to the last stage of the CCD. The presence of this larger fat zero charge in the last stage and very little fat zero charge in the initial stage, results in good charge transfer efficiency (CTE) in the last stage a substantially degraded (CTE) in the first stage where charge transfer efficiency has its largest effect on performance.

Accordingly, it is an object of this invention to provide an infrared energy detection and imaging system having improved sensitivity and signal-to-noise ratio.

Another object of the invention is to improve the infrared energy collection efficiency through an increase in integration time.

Still another object of the invention is to increase the storage capacity of the infrared energy storage sites.

Yet another object of the invention is to improve the charge transfer efficiency for transferring infrared energy charge packets.

Briefly stated the invention comprises a forward looking infrared (FLIR) system including a lens assembly, scanning assembly, detector assembly and video electronic circuitry. The detector assembly comprises a ramped charge transfer device (CTD) matrix. The matrix includes a plurality of charge transfer device elements arrange in rows and columns. Each pair of rows of elements constitutes a stage and each element of each stage is a CTD having a preselected number of phase electrodes which are used selectively for the collection of charge packets representative of impinging infrared energy and for the transfer of the charge packets to successive stages. Increasing (ramping) voltages are applied to selected elements of each stage to successively increase the charge collecting capacity of the matrix. The application of these ramping voltages are synchronized with the scanning rate. Thus each stage of elements sees the same image, and after the first stage, the next stage collects the charge packet of the preceeding stage and adds to it an additional charge packet representative of the same scene portion. In this manner, the voltage indicative of the scene is substantially increased to a working voltage and the integration time is substantially increased.

A detailed description of a preferred embodiment of this invention follows with reference being made to drawings wherein like parts have been given like reference numerals for clarity and understanding of the elements and features of the invention.

FIG. 3 is a partial cross-sectional view of the parallel shift register taken along line A—A of FIG. 2a;

FIG. 4 is a partial cross-sectional view of the serial shift register taken along line B—B of FIG. 2a;

Figure 1:
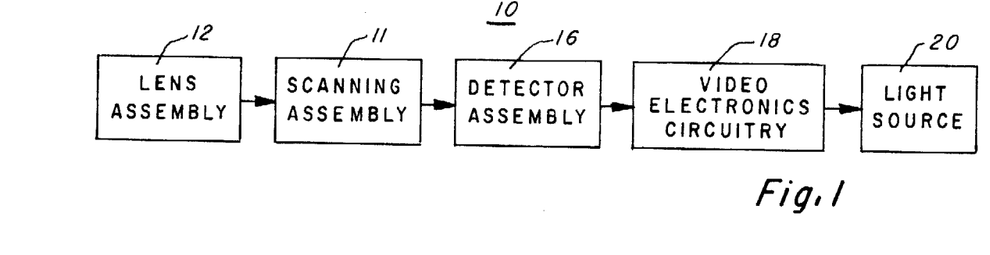
FIG. 1 is a block diagram of a forward looking infrared system.

Referring now to FIG. 1, the forward looking infrared system 10 comprises a lens assembly 12, scanning assembly 14, detector assembly 16, video electronics circuitry 18, and a display or light source 20. The lens assembly 12 is comprised of three lens elements, not shown, which for operation in the infrared region, may consist of three germanium elements. These elements collect infrared energy emanating from a scene and focus this energy onto a rotating mirror, not shown, of the scanning assembly 14. The rotating or nutating mirror may be, for example, a two sided flat mirror. The first side, or front surface, of the mirror is used to receive the infrared energy, and the second side, or rear surface, of the mirror is used to scan the modulated visible light from the light source 20. The scanning mirror is positioned with its "Y" axis normal to the optical axis and its "X" axis at a 45° angle thereto. The scanning mirror is rotated at a rate to provide a preselected frequency such as, for example, 30 or 60 scans/sec. by a small synchronous motor or in some instances by a solenoid. The solenoid causes the mirror to move against a return spring for oscillation. The scanning mirror reflects the infrared energy to a folding mirror, not shown, for reflection onto the detector array of detector assembly 16, hereinafter described in detail. The detector array converts the infrared energy to electrical signals for processing in the video electronics circuitry 18. The video electronics provides the signal processing auxiliary functions to modulate the output of the light source 20 or other display means. The light source or display 20 may be an array of light emitting diodes or a cathode ray tube (CRT). Those desiring details of suitable structures for the above elements are referred to U.S. Pat. No. 3,912,927 issued Oct. 14, 1975 to Richard G. Hoffman, II, for an "Opto-Mechanical Device For Phase Shift Compensation of Oscillating Mirror Scanners."

Figure 2A:
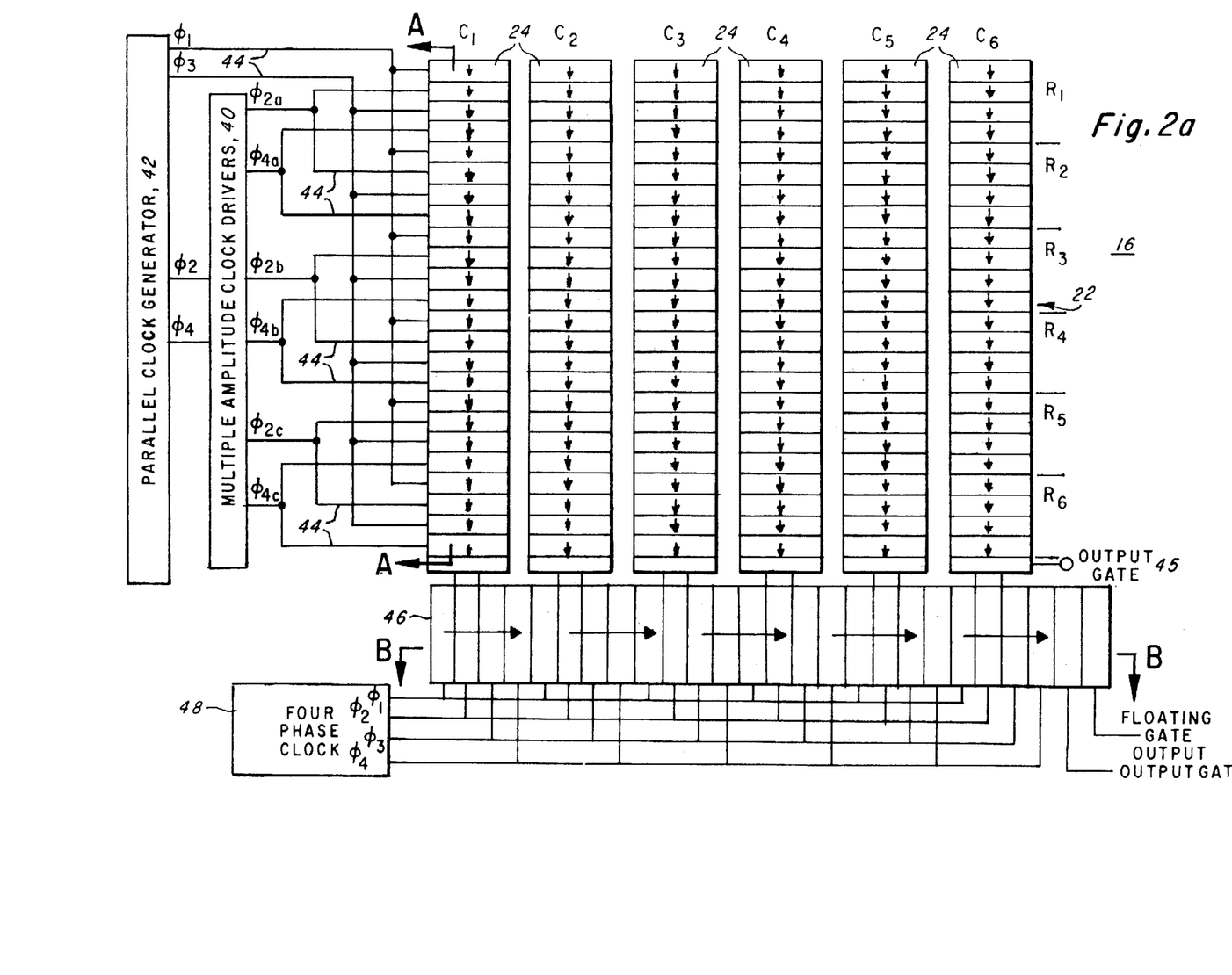
FIGS. 2a and 2b are views showing the charge transfer device matrix matrix and related circuitry.
Figure 2B:
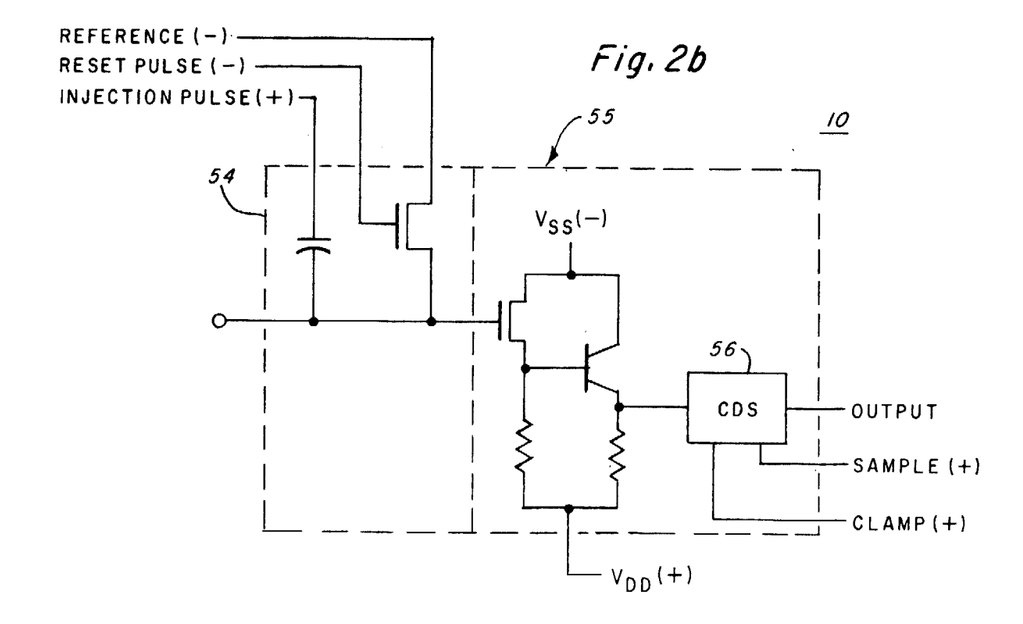
Figure 3:
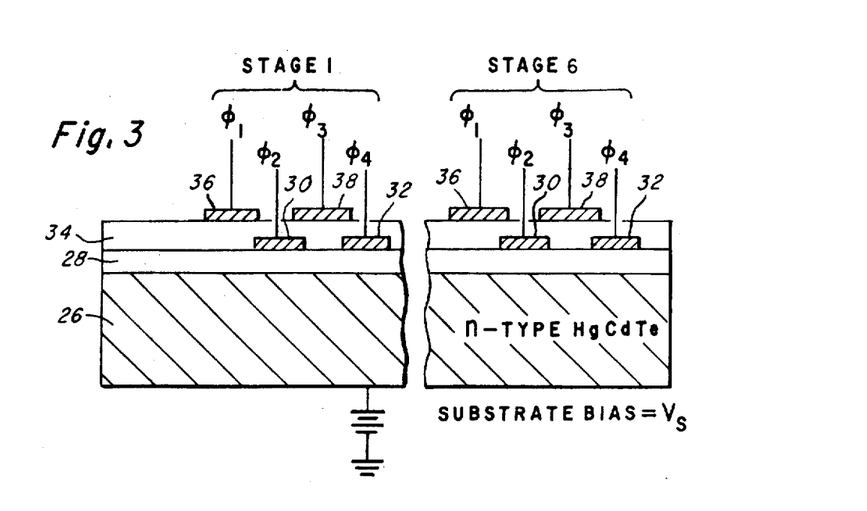

Referring now to FIGS. 2a and 2b, the detector array assembly 16 comprises a charge transfer device (CTD) infrared sensor matrix 22. The CTD matrix 22 is preferably a charge coupled device (CCD) matrix. The CCD matrix 22 is essentially a plurality of parallel CCD shift registers with their CCD elements 24 arranged in rows and columns. A six by six element array 22 is shown for disclosure purposes, although it will be appreciated that larger arrays will be used in practice. Each element 24 (FIG. 2a) is formed on a semiconductor substrate 26 (FIG. 3); the substrate is, for example, an n-type mercury/cadmium/telluride (HgCdTe) substrate. Other suitable materials are PbSnTe, InAsSb, and GaInSb. A layer 28 of insulating material such as, for example, ZnS is formed on the substrate 26, and the layer is metalized with an infrared transparent metal such as, for example, nickel 100 to 150 Angstrom units thick to form a plurality of first level electrodes 30 and 32. A second layer 34 of the insulating material is formed on the first layer 28 over the electrodes 30 and 32, and the second layer is metalized with, another infrared transparent metal such as thin nickel, to form a plurality of second level electrodes 36 and 38. The electrodes 36 and 38 are formed in an overlapping relationship to electrodes 30 and 32. Those persons skilled in the art desiring detailed information for the construction of the CCD register elements are referred to U.S. Pat. No. 4,231,149, filed Oct. 10, 1978, for a "Narrow Bandgap Semiconductor CCD Imaging Device and Method of Fabrication."

The electrodes 30, 32, 36 and 38 of each stage of the parallel shift register are connected by metalized bus lines 44. The metal bus lines are connected either directly to the four phase parallel clock generator 42 or indirectly to the clock generator through a clock driver 40 which provides several different amplitude (ramping) pulses for the phase-2 and phase-4 waveforms. The frequency of the parallel clock generator is set at a value to provide synchronization of the moving potential wells and the moving infrared image. The detector elements 24 of each column are connected to the bus lines as follows: the phase 1 electrode of each element are connected together; the phase 2 electrodes are connected successively in pairs; the phase 3 electrodes are connected together; and the phase 4 electrodes are connected successively in pairs. The phase 1 and phase 3 electrodes, as transfer gates, receive a preselected voltage $V_1$. The phase 2 and phase 4 electrodes of stages A, B and C receive a preselected voltage $V_{2a}$, $V_{2b}$, and $V_{2c}$, respectively. The voltages $V_{2a}$, $V_{2b}$, and $V_{2c}$ are of stepped values which are small for the first stages and largest for the last stages. For purposes of disclosure the phase 2 and 4 phase electrodes are grouped in pairs; other groupings such as one per clock amplitude or any number larger than two per clock amplitude could also be used based on a compromise between a need for a near continuous increase in amplitude (linear ramp) and a need to limit the maximum number of clock amplitudes and bond pads to the bus lines.

Figure 4:
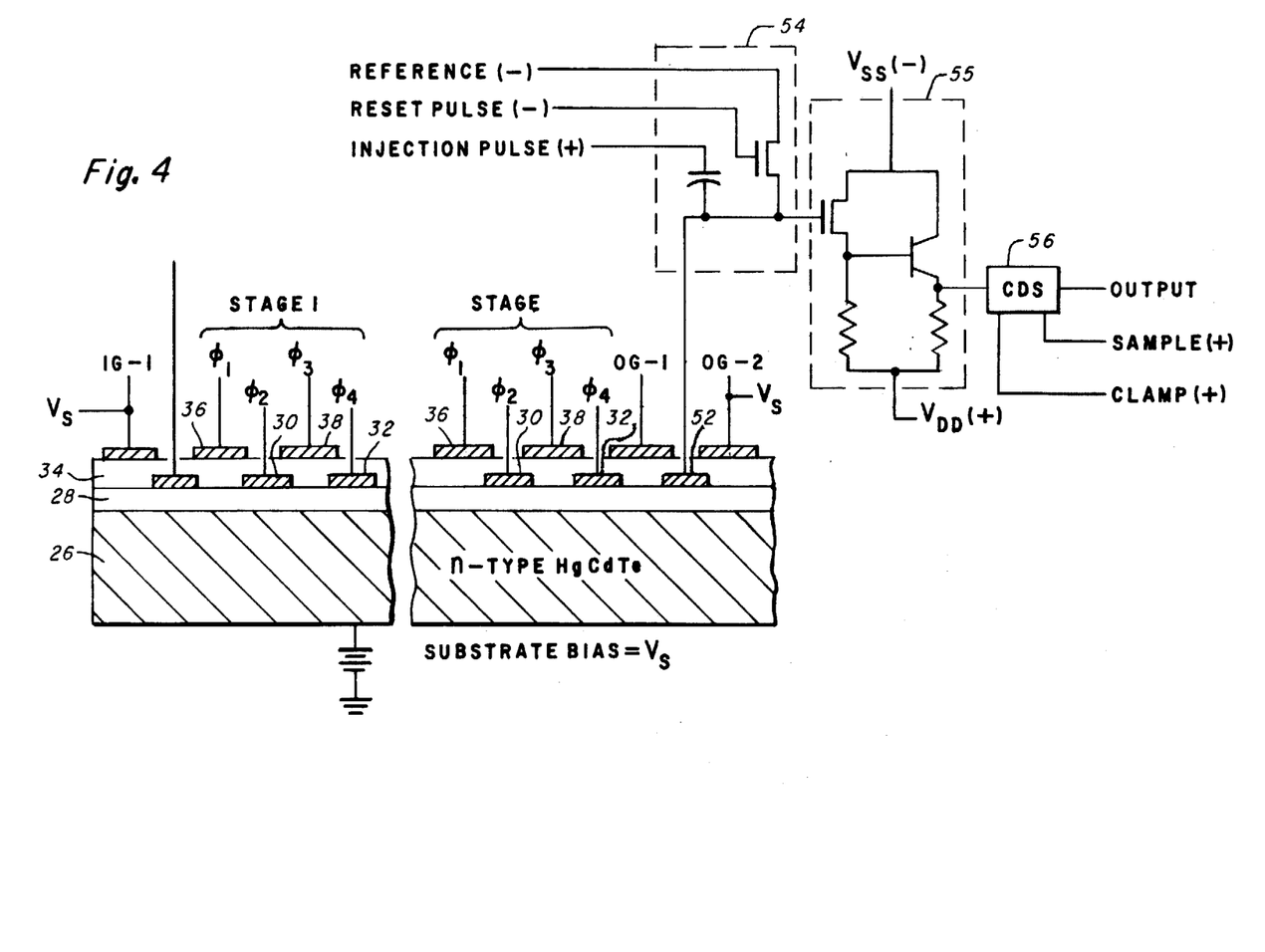

A serial shift register 46 is connected to the column outputs of the parallel shift register 22 by means of an output gate 45. The serial shift register 46 is also a four phase CCD shift register (FIG. 4) whose parts are identical to those of the parallel shift register, but each potential well is wider as shown in FIG. 2a to provide sufficient charge capacity to hold the ramped charge packet output of the parallel shift register matrix by means of fixed value (not ramped) serial clocks. A serial clock generator 48 (FIG. 2a) controls the phase operation of the serial shift register.

The output of the serial shift register 46 is either a floating gate 52 or a diode (FIG. 4) fabricated on the infrared sensing semiconductor. The floating gate 52 (FIG. 4) is a metal-insulator-semiconductor (MIS) structure. That is, it has a semiconductor substrate supporting an insulating layer, and a metalized electrode on top of the insulating layer fabricated in the same manner as the phase electrodes. The floating gate has a capacity sufficient to hold each integrated charge packet. The sufficient capacity at maximum empty well voltage is obtained by increased area (i.e., width or width and length). The floating gate 52 or diode is connected to buffer circuit 55, reset FET 54, and clamp, sample, and hold circuit 56 of the video electronics cicruitry 18. The clamp-sample-and hold circuitry 18 will be fabricated in a silicon chip separate from the infrared sensing chip. In one embodiment, the buffer FET and reset FET will be fabricated in the infrared sensing semiconductor. In another embodiment, the buffer FET and reset FET will be fabricated on a silicon chip adjacent to the infrared sensing semiconductor chip.

Figure 5:
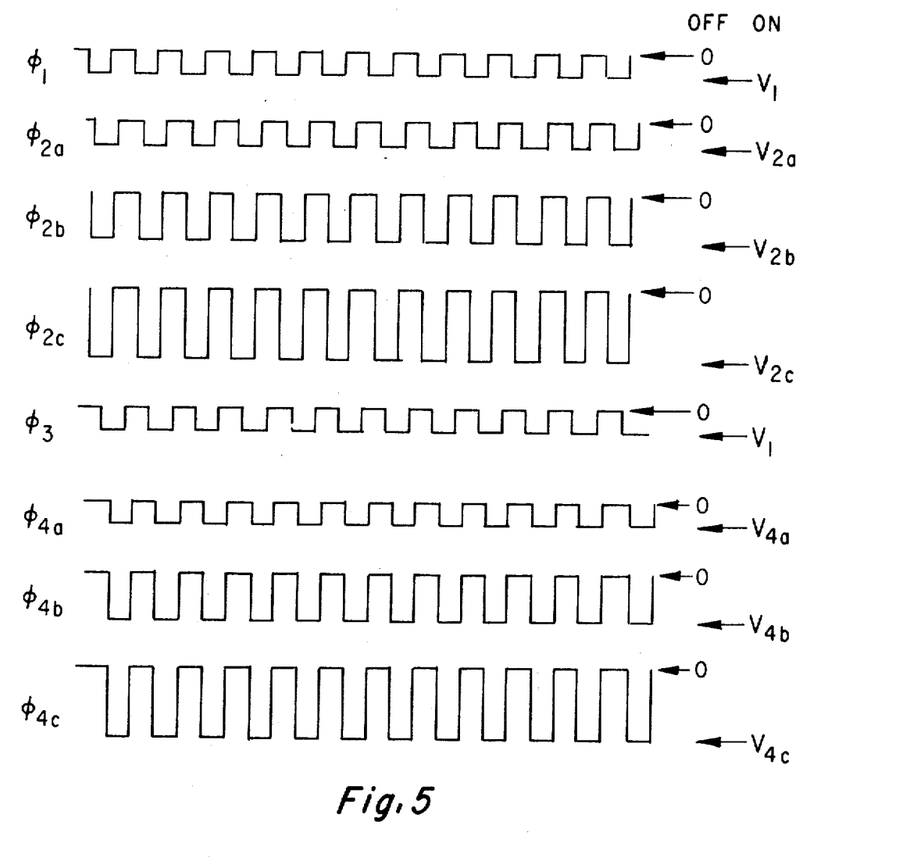
FIG. 5 is a view showing the clock pulses or voltages corresponding to the division of the phase 2 and phase 4 clocks for three groups of stages a, b, and c.

In ramped operation (FIG. 5), a larger clock voltages $V_1$, $V_{2a}$, $V_{2b}$, and $V_{2c}$ are used for each stage of the parallel register matrix 22 (FIG. 2a). Ramping is most important for the longer wavelength (narrow bandgap) CCDs in which 4–12 parallel stages are adequate to obtain significant improvement in signal-to-noise ratio. As shown in FIG. 5, a clock pulse of voltage $V_1$ is applied simultaneously to each phase 1 electrode of the CCD elements making up a column of the shift register matrix. Just before the phase 1 clock pulse goes off, clock pulses of voltages $V_{2a}$, $V_{2b}$ and $V_{2c}$ are applied, respectively, to the phase 2 electrodes of the pairs of CCD elements forming stages A, B, and C. Then just before the clock pulses for the phase 2 electrodes go off, a clock pulse of voltage $V_1$ is applied simultaneously to each phase-3 electrode and concomitantly therewith the phase-1 clock pulse goes off. Finally, just before the phase-3 clock pulse goes off, clock pulses of voltages $V_{4a}$, $V_{4b}$, and $V_{4c}$ are applied, respectively, to the phase 4 electrodes and concomitantly therewith the phase-2 clock pulses go off.

Figure 6:
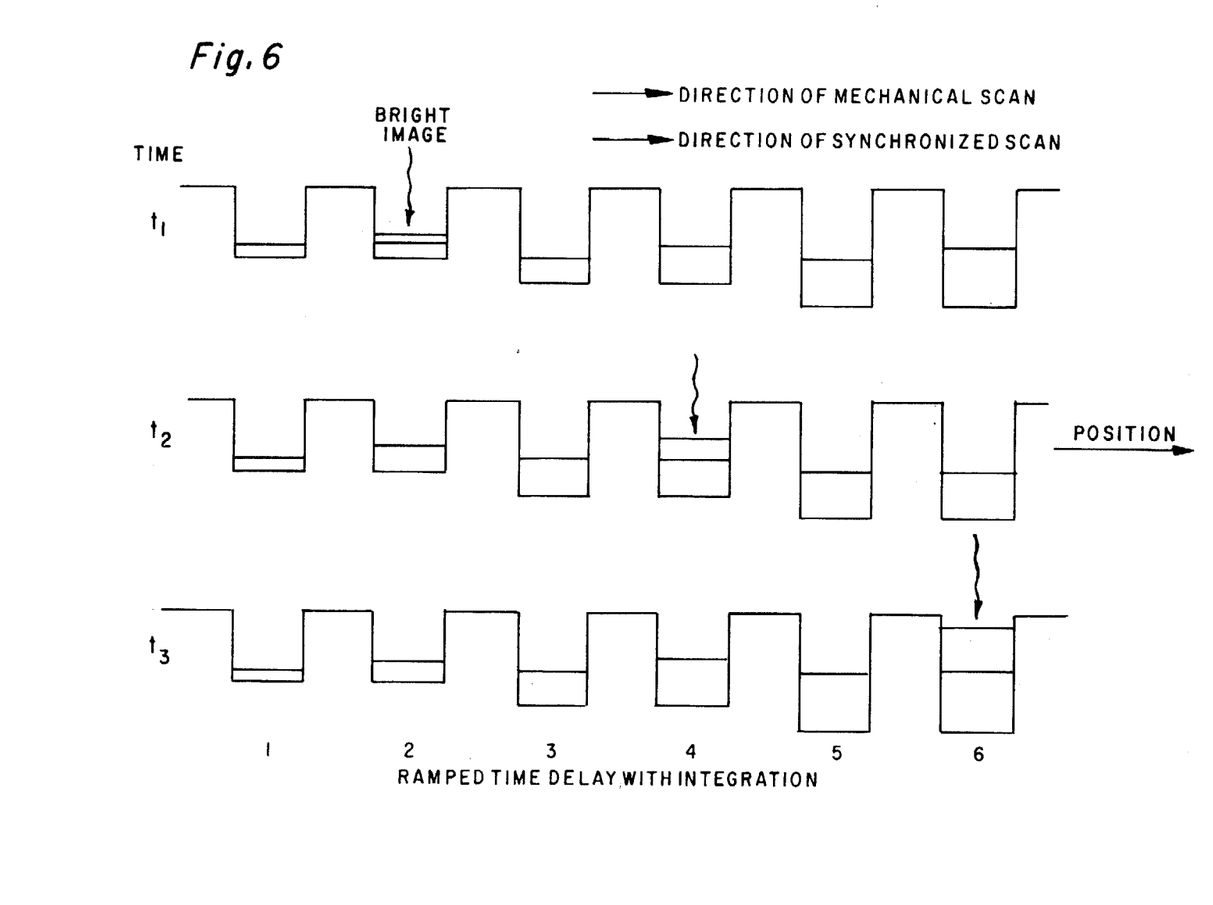
FIG. 6 is a view showing the build up of signal and background charge in the ramped wells as a bright image pixel is moved in synchronization with the potential wells.

As previously mentioned, the average rate of clocking is synchronized with the scan rate of the system. Thus, as shown in FIG. 6, at stage A and time $t_1$ a bright image is scanned and focused on the second phase-2 potential well; at time $t_2$ the charge packet representative of the bright image of stage A arrives at the fourth phase-2 potential well or second potential well of stage B simultaneously with the focusing of the same bright image detected in the second scan; and at time $t_3$ the integrated charge packets of stages A and B arrive at the sixth phase-2 potential well or second potential well of stage C simultaneously with the focusing of the same bright image detected in the first and second stages. The ramping voltages of FIG. 5 provide adequate capacity for the total charge of the charge packets which include infrared background and signal generated charge. The integrated charge packet is then outputted to the serial shift register and clocked out to the floating gate. The size of each element of the serial shift register is sufficient to hold the integrated charge packet. Thus, the system provides for time delay with integration.

Figure 7:
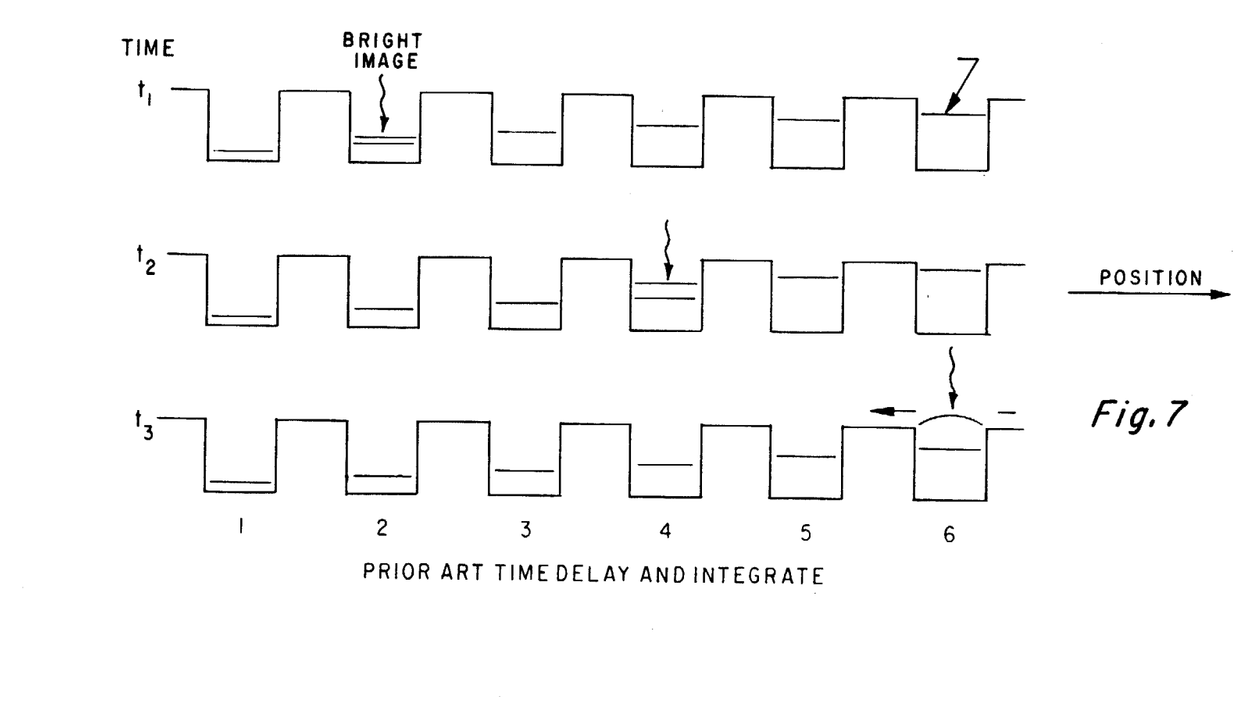
FIG. 7 is a view showing the build up of signal and background charge in a prior art art system.

FIG. 7 shows the potential wells of the prior art system utilizing the same integration period. As shown, the potential well at time $t_3$ is of insufficient depth to hold the charge packet and it overflows. In the prior art, the maximum charge capacity is set by the maximum voltage and empty well depth at stage #1; this maximum is set in turn by electric field breakdown in the infrared sensing semiconductor. In the ramped array of FIG. 6, the maximum voltage in the nearly-empty stage 1 well is low to prevent electric field breakdown while the last stage well is deep enough to contain the total charge. Electric field breakdown in well #6 of FIG. 6 is prevented by the background generated in this last well.

Figure 8:
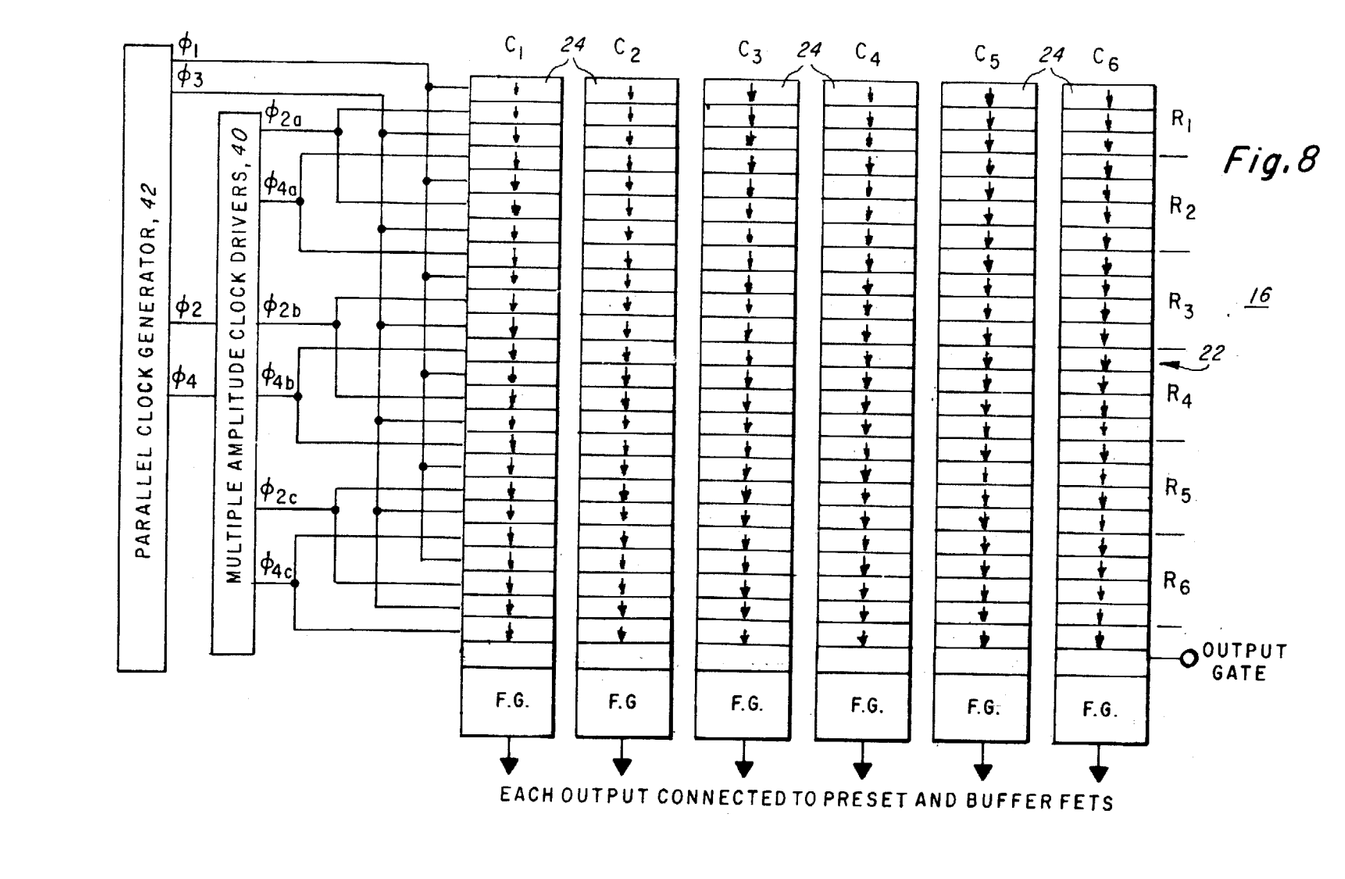
FIG. 8 is a plan view of a second embodiment of the invention.

The serial shift register (FIG. 2a) can be replaced by a plurality of floating gates; one per column (FIG. 8). In this embodiment, each floating gate is provided with its own preset and buffer FETs. Each structure is that shown in FIG. 2b which is that of FIG. 4. The embodiment of FIG. 8 has at least two advantages: (1) the complexity of the serial register and clocks is not required and (2) the frequency bandwidth which must be provided for the signal processing circuitry is much lower than that required for signal processing of output from the FIG. 2a array. Smaller electronic bandwidth means less wide bandwidth noise at the buffer FET.

Although several embodiments of this invention have been described herein it will be apparent to a person skilled in the art that various modifications to the details of construction shown and described may be made without departing from the scope of this invention.

What is claimed:

1. An infrared energy detector system comprising:
   (a) a scanning assembly for scanning at a preselected rate a scene emanating infrared energy;
   (b) an infrared detector matrix of charge coupled devices in the scanning path of the scanning assembly for converting the impinging infrared energy into electrical charge packets representative of received infrared energy, said infrared detector matrix comprising a plurality of charge coupled device elements arranged in rows and columns, elements of the columns of charge coupled devices selectively connected together to form a plurality of integration stages, and means for applying selected phase clock pulses to said integration stages to synchronize the movement of the charge packets through said matrix with the image of the scene scanned by the scanning assembly, at least two of said phase clock pulses having the same phase but different amplitude, to produce electrical charge packets in the first stage which are integrated with the charge packets to each succeeding stage of the plurality of integration stages to provide time delay with integration of charge packets within said matrix thereby producing integrating signals representative of the scene; and
   (c) signal processing means for processing the integrated signals into video signals representative of the infrared energy emanating from the scene.

2. An infrared energy detector system according to claim 1 wherein said at least two phase clock pulses are of stepped values which are smaller in amplitude for the first stages and largest in amplitude for the last stages.

3. An infrared energy detector system according to claim 1 wherein each charge coupled device has a first preselected number of electrodes forming potential wells and a second preselected number of electrodes forming transfer gates, means connecting a preselected number of corresponding potential well forming electrodes to selected phase clock pulses, and means connecting the transfer gate electrodes to a preselected voltage for transfering electrical charge packets from one potential well to another.

4. An infrared energy detector system according to claim 1 wherein said means for applying selected multiple amplitude voltages is a variable amplitude generator.

5. An infrared energy detector system according to claim 1 wherein the elements of the columns of charge coupled devices are grouped together in preselected numbers to form a preselected number of stages.

6. An infrared energy detector system according to claim 1 wherein the charge coupled device elements of the detector matrix are fabricated on a narrow bandgap semiconductor material taken from the group consisting of HgCdTe, PbSnTe, InSb, InAsSb, GnInSb.

7. An infrared energy detector system according to claim 1 wherein each stage of the matrix has four electrodes for four phase operation and a clock generator and clock drivers with separate connections to selected phase 2 and selected phase 4 electrodes, one connection to all phase-1 electrodes, and another connection to all phase 3 electrodes to provide a quasi-two phase operation.

8. An infrared energy detector system according to claim 1 wherein the signal processing means includes a serial shift register for multiplexing out the integrated charge packet of the charge coupled device detector matrix, and a floating gate at the end of the serial shift register for converting the charge packets into said integrating signals for video processing.

9. An infrared energy detector according to claim 8 wherein the serial shift register includes wells having a capacity substantially larger than the capacity of the potential wells of each detector column.

10. An infrared energy detector system according to claim 1 wherein the signal processing means includes a floating gate connected to the output gate of each column of the charge coupled device detector matrix for video signal processing.

11. An infrared energy detector system according to claim 10 wherein the floating gate has a potential well capacity sufficient to contain each integrated charge packet.

12. An infrared energy detector system according to claim 1 wherein the average rate of clocking the selected phase clock pulses is synchronized with the scan rate of the system.

* * * * *